United States Patent [19]

Arai et al.

[11] Patent Number: 4,520,174
[45] Date of Patent: May 28, 1985

[54] METHOD OF MAKING HEAT-RESISTANT POLYESTER

[75] Inventors: Yoshihiro Arai, Joyo; Takumi Tanaka, Uji, both of Japan

[73] Assignee: Unitika Ltd., Osaka, Japan

[21] Appl. No.: 623,062

[22] Filed: Jun. 22, 1984

[30] Foreign Application Priority Data

Jul. 8, 1983 [JP] Japan .............................. 58-124912

[51] Int. Cl.³ .............................................. C08G 63/76
[52] U.S. Cl. .................................... 525/438; 528/288; 528/289; 528/297; 528/308.2
[58] Field of Search ................ 525/438; 528/297, 288, 528/289, 308.2

[56] References Cited

U.S. PATENT DOCUMENTS 4,139,521  2/1979  Lazarus et al. ................ 528/297 X
4,459,390  7/1984  Arai et al. ............................ 525/438

Primary Examiner—Lucille M. Phynes
Attorney, Agent, or Firm—R. A. Anderson

[57] ABSTRACT

This invention is a method of making heat-resistant polyester, the method being characterized by reacting the polyester consisting of the aromatic dicarboxylic acid and the glycol component of 2-6 carbons with 0.1-5 weight percent of the bifunctional epoxy compound given by the general formula

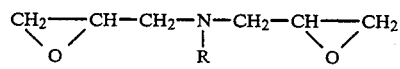

(R is an organic group containing benzene ring) to reduce the amount of the end carboxyl group to below 15 g equivalents per $10^6$ g of the polymer.

4 Claims, No Drawings

METHOD OF MAKING HEAT-RESISTANT POLYESTER

BACKGROUND OF THE INVENTION

This invention is related to the method of making heat-resistant polyester in which the amount of end carboxyl group (hereinafter, this will be abbreviated by COOH) has been reduced.

As to the method of reducing the COOH of polyester, various methods have been proposed. As the typical example, the method of reacting the polyester and epoxy compound is known. However, the present inventors have examined this method and found that the addition of epoxy compounds reduces the COOH but it also reduces the degree of polymerization and that, depending on the epoxy compound, its reactivity with the COOH of polyester is not sufficient, giving insufficient effect.

SUMMARY OF THE INVENTION

The present inventors have carried out studies to solve this problem and, as the result, have discovered that reaction with the bifunctional epoxy compound given by the following general formula

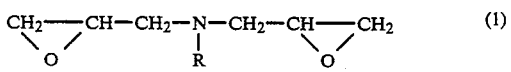

(R is an organic group containing benzene ring) is effective; thus, this invention has been achieved.

In other words, the key point of this invention is the method of making heat-resistant polyester, the method being characterized by reacting the polyester consisting of aromatic dicarboxylic acid and glycol component of 2-6 carbons with 0.1-5 weight percent of the bifunctional epoxy compound given by the above general formula (1) to reduce the COOH to below 15 g equivalents per $10^6$ g of the polymer.

In this invention, the polyester means the condensation polymer of the aromatic dicarboxylic acid and glycol of 2-6 carbons and there is no special restriction on the type. It may be either a homopolymer or copolymer. As for the method of polycondensation of the polyester, one can use the known methods without any changes.

As to the bifunctional epoxy compound given by the above general formula (1) in this invention, the following can be raised:
N,N-diglycidyl-benzylamine
N,N-diglycidyl-aniline
N,N-diglycidyl-2-methylaniline
N,N-diglycidyl-3-methylaniline
N,N-diglycidyl-4-methylaniline
N,N-diglycidyl-2,6-dimethylaniline
N,N-diglycidyl-3,5-dimethylaniline
N,N-diglycidyl-4-ethylaniline
N,N-diglycidyl-1-phenylethylamine
N,N-diglycidyl-2-phenylethylamine
N,N-diglycidyl-1-phenyl-1-propylamine
N,N-diglycidyl-2-phenyl-2-propylamine
N,N-diglycidyl-2-propylaniline
N,N-diglycidyl-3-propylaniline
N,N-diglycidyl-4-propylaniline
N,N-diglycidyl-2,4,6-trimethylaniline.

These compounds can be synthesized by starting from the compounds given by $RNH_2$ and substituting the hydrogen atom on the nitrogen atom by glycidyl group.

In other words, the glycidyl group is introduced directly by reacting the $-NH_2$ group of the starting substance with epihalohydrin, particularly with epichlorohydrin or epibromohydrin. This reaction can be carried out well in the presence of a catalyst which is a small amount of quaternary ammonium compound such as tetraethylammonium bromide.

Such bifunctional epoxy compounds can be used alone or in combinations of two or more.

The amount of addition of the compound of above formula (1) which is used in this invention is 0.1-5 weight percent with respect to the polyester. If this amount is too small, degree of blocking the COOH is low; and, if it is too much, the reaction would proceed sufficiently but the gelation of polyester would cause an abnormal rise of the pressure inside the extruder, making it impossible to carry out the spinning; thus, undesirable problems are encountered.

The reaction between the polyester and the compound given by the above general formula (1) is carried out by adding the compound of the above general formula (1) when the intrinsic viscosity of the polyester reaches 0.50, taking more than three minutes at a temperature which is usually above the melt temperature of the polyester. The intrinsic viscosity referred to here is measured at 20° C. using the mixture solvent of phenol-/ethanetetrachloride (1/1 weight ratio). At the time of reaction, it is naturally necessary that the reactor is filled with an inert gas such as nitrogen gas or is barred from active gases which would accelerate the decomposition of the polyester such as oxygen by some other methods. Also, the reaction should be carried out while stirring. The compound given by the above general formula (1) may be added and mixed before the polycondensation of the polyester is completed; but, one can also adopt the method in which it is added and mixed to the polyester in the molten state after the completion of polymerization before melt spinning or the method in which it is mixed to the granules of polyester solid and then is melt spun to react. The reaction would occur without a catalyst but one may add a suitable catalyst.

By the addition of the compound given by the above general formula (1), COOH of the polyester is effectively reduced; also, as the compound of the above general formula (1) is bifunctional, addition of this compound does not reduce degree of polymerization; rather, the polyester molecular chains are linked and there results a rise of the degree of polymerization.

In this way, by reducing the COOH to below 15 g equivalents per $10^6$ g of the polymer by reacting the polyester with 0.1-5 weight percent of the compound given by the above general formula (1), the improvement of heat resistance is achieved.

Furthermore, in obtaining the polyester of this invention, it is naturally possible to add other additives for the other purposes to the polyester.

The final form of the polyester in this invention can be fiber, film, and any other form.

The polyester with reduced COOH as obtained by the method of this invention has improved heat resistance, i.e., improved resistance to hydrolysis or aminolysis at high temperature. This makes it possible to achieve the upgrading of performance and process optimization in the conventional applications as well as to find new applications to the areas where application was not possible in the past. Thus, the improvement of the practical value is remarkable.

In the following, this invention is explained more specifically through the examples of application.

EXAMPLES OF INVENTION AND COMPARATIVE EXAMPLES

To the polyethylene terephthalate chip of intrinsic viscosity 0.73 and COOH of less than 24 g equivalents per $10^6$ g of the polymer as obtained by the common method from terephthalic acid and ethylene glycol, the epoxy compound listed in Table 1 was added by the amount shown in Table 1 to blend. Then, spinning was carried out by use of a spinnerette die having 192 holes of diameter 0.5 mm. The spinning conditions were: temperature 300° C., residence time 3–12 minutes, throughput 300 g per minute, take-up speed 317 m/minute; the yarn obtained had 8520 d/192 f. The undrawn yarn obtained was drawn to 3.8 times at 90° C. in the first stage and was drawn to 1.5 times at 200° C. in the second stage. Subsequently, the yarn was heat treated under tension at 220° C. and, finally, drawn yarn of 1500 d/192 f was obtained. With the drawn yarn obtained, first 40 T/10 cm Z twist was applied; then, two strands were taken together and 40 T/10 cm S twist was applied to obtain the 1500 d×2 greige cord. This greige cord was dipped in Pexul (product of ICI Company)-RFL solution. Then, a tension of 1.0 kg per cord was applied and heat-treatment was carried out at 240° C. for three hours to make the treated cord. Next, in order to examine the heat resistance of the treated cord, heat-resistant strength was measured for the sample which was prepared under the vulcanization condition of 170° C., 100 kg/cm², 60 minutes. Then, the adhesive strength of the treated cord was evaluated by the H-test. First, the test piece was prepared by vulcanization adhesion at 150° C., 100 kg/cm², 30 minutes and then the adhesive strength was measured. Properties of the drawn yarn and treated cord are shown in Table 1.

The epoxy compound in the Examples of Invention, 1–4, was synthesized by reacting benzyl amine, aniline, 2-methyl aniline, 1-phenylethylamine and epichlorohydrin by use of a small amount of tetraethylammonium bromide as the catalyst.

Denacol EX-221 of Comparative Example 5 is the trade name (Nagase Sangyosha) of dibromoneopentylglycoldiglycidylether.

From Table 1, it is seen with the Examples of Invention 1–4, which satisfied the requirements of this invention, that by the addition of the epoxy compound, COOH decreased, intrinsic viscosity increased, heat-resistance strength and heat-resistance strength retention improved and adhesion strength also improved.

When the amount of addition of the epoxy compound was too little (Comparative Example 2), the effect was insufficient. When it was too much (Comparative Example 3), polyester gelled and the pressure inside the extruder rose abnormally, making spinning impossible.

Comparative Examples 4 and 5 show the known examples. Comparative Example 4 used the monofunctional epoxy compound, and Comparative Example 5 used a bifunctional epoxy compound. In each case, addition of the epoxy compound resulted in the reduction of intrinsic viscosity. In comparative Example 5, reactivity between the epoxy compound and the COOH of polyester was poor and reduction of COOH was not observed.

TABLE 1

| | Epoxy Compound | | Drawn Yarn | | Treated Cord | | | |
|---|---|---|---|---|---|---|---|---|
| | Name of Compound | Amount Added, Wt. % | Intrinsic Viscosity | COOH g Equiv/ $10^6$ g | Strength kg | Heat Resistance Strength kg | Strength Retention, % | Adhesive Strength kg |
| 1 | Example of Invention 1 N,N—diglycidylbenzylamine | 0.5 | 0.91 | 9 | 22.9 | 19.2 | 83 | 20.2 |
| 1 | Comparative Example 1 | — | 0.70 | 29 | 18.4 | 11.0 | 60 | 15.2 |
| 2 | Example of Invention 2 N,N—diglycidyl-aniline | 0.5 | 0.90 | 10 | 22.9 | 18.9 | 84 | 20.3 |
| 3 | Example of Invention 3 N,N—diglycidyl-2-methylaniline | 0.5 | 0.88 | 11 | 22.5 | 18.9 | 82 | 19.9 |
| 4 | Example of Invention 4 N,N—diglycidyl-1-phenyl-ethylamine | 0.5 | 0.86 | 12 | 21.7 | 17.8 | 80 | 19.4 |
| 2 | Comparative Example 2 N,N—diglycidylbenzylamine | 0.05 | 0.70 | 20 | 17.8 | 12.5 | 66 | 15.0 |
| 3 | Comparative Example 3 Same as above | 6.0 | Spinning Impossible | | — | — | — | — |
| 4 | Comparative Example 4 N—glycidylphthalimide | 0.5 | 0.68 | 6 | 17.5 | 12. | 70 | 15.4 |
| 5 | Comparative Example 5 Denacol EX-221 | 0.5 | 0.67 | 26 | 17.1 | 10.5 | 61 | 14.2 |

We claim:

1. In a method of making heat resistant polyester consisting of the reaction product of an aromatic dicarboxylic acid and a glycol containing 2 to 6 carbon atoms, the improvement comprising reacting the polyester with 0.1 to 5 weight percent of a bifunctional epoxy compound having the formula

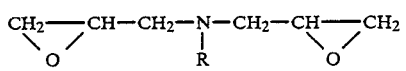

wherein R is an organic group containing a benzene ring, so that the carboxyl end groups in the polyester are reduced to below about 15 g equivalents per $10^6$ g of polymer.

2. The method of claim 1 wherein the polyester is polyethylene terephthalate.

3. The method of claim 1 wherein the bifunctional epoxy compound is selected from the group consisting of N,N-diglycidyl-benzylamine,
N,N-diglycidyl-aniline,
N,N-diglycidyl-2-methylaniline,
N,N-diglycidyl-3-methylaniline,
N,N-diglycidyl-4-methylaniline,
N,N-diglycidyl-2,6-dimethylaniline,
N,N-diglycidyl-3,5-dimethylaniline,
N,N-diglycidyl-4-ethylaniline,
N,N-diglycidyl-1-phenylethylamine,
N,N-diglycidyl-2-phenylethylamine,
N,N-diglycidyl-1-phenyl-1-propylamine,
N,N-diglycidyl-2-phenyl-2-propylamine,
N,N-diglycidyl-2-propylaniline,
N,N-diglycidyl-3-propylaniline,
N,N-diglycidyl-4-propylaniline, and
N,N-diglycidyl-2,4,6-trimethylaniline.

4. The method of claim 3 wherein the polyester is polyethylene terephthalate.

* * * * *